Jan. 2, 1962 D. V. RIDGEWAY 3,015,688

COLOR TELEVISION APPARATUS

Filed April 21, 1958 4 Sheets-Sheet 1

Inventor
Denis V. Ridgeway
By Holcombe, Wetherill & Brisebois
Attorneys

Inventor
Denis V. Ridgeway
By Holcombe, Wetherill & Brisebois
Attorneys

Jan. 2, 1962 D. V. RIDGEWAY 3,015,688

COLOR TELEVISION APPARATUS

Filed April 21, 1958 4 Sheets-Sheet 3

Inventor
Denis V. Ridgeway
By Holcomb, Wetherill & Brisebois
Attorneys

COLOR TELEVISION APPARATUS

Filed April 21, 1958 4 Sheets-Sheet 4

Inventor
Denis V. Ridgeway
By
Holcombe, Wetherill & Brisebois
Attorneys

United States Patent Office 3,015,688

Patented Jan. 2, 1962

3,015,688

COLOR TELEVISION APPARATUS

Denis V. Ridgeway, Cambridge, England, assignor to Pye Limited, Cambridge, England, a company of Great Britain Filed Apr. 21, 1958, Ser. No. 729,570
Claims priority, application Great Britain Apr. 24, 1957
13 Claims. (Cl. 178—5.4)

Conventional colour television cameras employ 3 camera tubes to generate the required 3 colour information (green, red and blue) for a "simultaneous" system. It is normal for the 3 camera tubes to view the scene or object, to be transmitted, via some form of optical beam-splitter in order to avoid parallax errors. The optical and electrical arrangements must be very well matched in the 3 channels in order to avoid any significant relative errors in the picture reproduced by a perfect receiver. The most serious of these errors are errors in registration, causing colour fringes on edges, and errors in hue which result in an inaccurate representation of the original colour.

Consequently it is necessary for all major parameters (both optical and electrical), in which significant relative errors may occur, to be capable of adjustment in order accurately to match the 3 channels. This results, at the present state of the art, in the provision of a large number of controls in each of the 3 channels. These controls require accurate adjustment, which takes a considerable time, and obviously they must remain in adjustment, within quite close limits, with the changes which occur in use, such as with variations of temperature, or with movement of the camera. This need to reduce to insignificant proportions any significant relative errors between the 3 output signals from the 3 camera tubes represents one of the major problems in the design of present-day colour cameras. It has resulted in cameras that are both large and costly. Also, as the cameras are difficult to adjust and maintain, errors of the type discussed are not always absent in colour transmissions.

From one aspect, the invention consists in a colour television camera comprising only 2 camera tubes to analyse a subject in terms of its green, red and blue components, wherein one tube is used to produce signals corresponding to both the green and the red components and the second tube is used to produce signals corresponding to the blue component only.

The camera according to this invention possesses considerable advantages over present-day colour cameras incorporating 3 camera tubes. With the conventional colour camera it is found, for reasons already well known, that errors, and particularly registration and colour balance errors between the green and red channels, are more easily visible on the picture reproduced by the receiver than errors between these two channels and the blue channel. With the camera of this invention in which only one camera tube is used to produce both the green and red component signals and a second camera tube to produce the blue component signals, the major source of relative errors between the green and red channels no longer exists and the importance of the remaining errors between the 2 camera tubes is considerably reduced.

The invention also consists in a novel camera tube for simultaneously deriving the signals of two colour components, particularly the red and green components.

A feature of the invention consists in novel filter elements for use in the construction of two colour camera tubes according to this invention. A further feature of the invention consists in methods of making such filter elements.

In order that the invention may be more clearly understood, reference will now be made to the accompanying drawings. In the drawings:

FIGURE 1 shows diagrammatically one arrangement of television camera according to this invention, FIGURE 2 shows diagrammatically an alternative arrangement, FIGURE 3 shows diagrammatically a section through one embodiment of camera tube according to this invention, FIGURE 4 shows the disposition of the signal plate elements of the tube, FIGURE 5 is a circuit diagram, FIGURES 6, 7 and 8 are diagrams for explaining one construction of the signal plate strips and filter, FIGURE 9 is an exploded perspective view showing a modified construction of the target assembly for a photoconductive pick-up tube.

Figure 1:
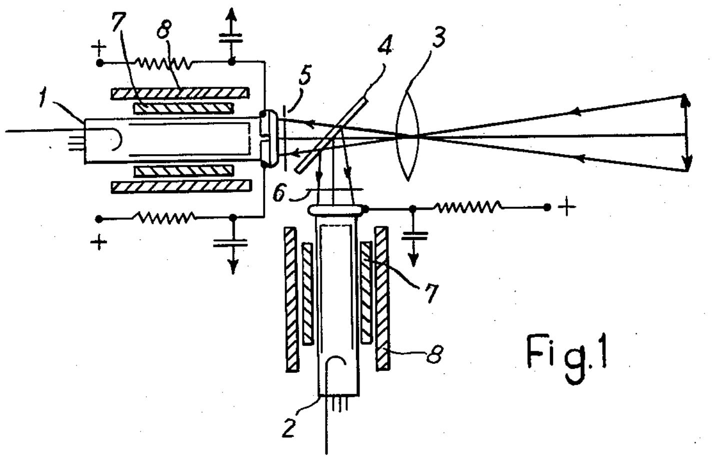

FIGURE 1 shows one embodiment of a camera according to this invention comprising two camera tubes 1 and 2, the tube 1 being a special tube for producing the green and red components and the tube 2 being a conventional type of tube for producing the blue component. The tubes are indicated as being of the photo-conductive type. The details of construction of the tube 1 will be later described.

3 indicates a lens or lens system which is common to both camera tubes which may be arranged at right angles to one another, light from the object passing through the lens 3 falling on a beam-splitting device 4 whereby the light may be directed on to both tubes. In front of the tube 1 is arranged a minus blue filter 5 and in front of the tube 2 a blue filter 6. Each tube is provided with a deflecting coil 7 and a focussing coil 8 is disposed in known manner.

Figure 2:
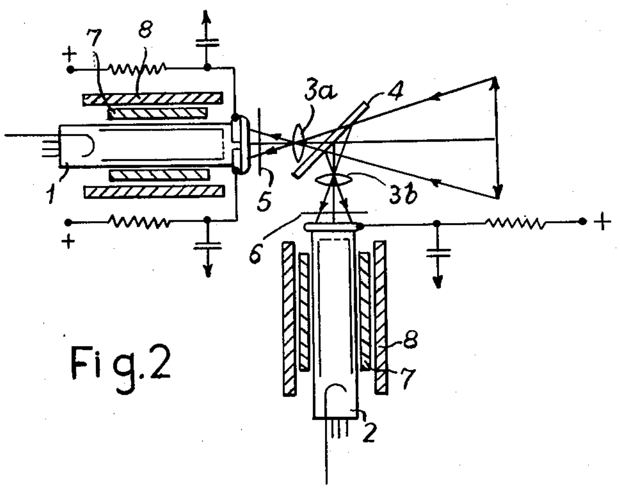

FIGURE 2 shows an alternative arrangement in which each camera tube is provided with its own lens system *3a*, *3b*, instead of a common lens system as in FIGURE 1, and the beam-splitting device 4 is disposed between the lenses and the object.

In both embodiments the beam-splitter 4 may be either a semi-reflecting mirror, a dichroic mirror, or any equivalent device.

Figure 3:
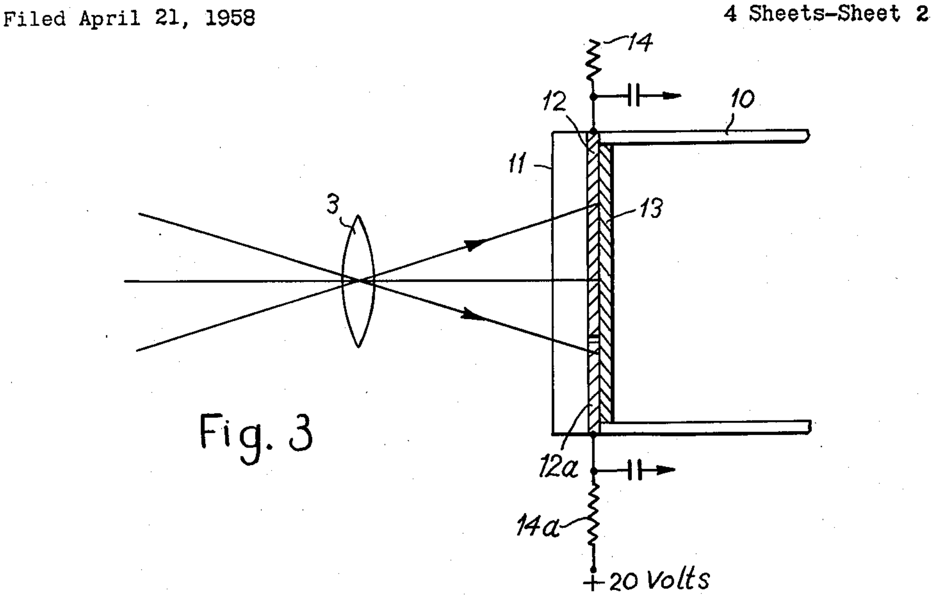

The camera tube 2 may be a conventional tube of the photo-conductive type. As indicated in FIGURE 3 such tube generally comprises a glass envelope 10 of which the glass end wall 11 has deposited thereon a signal plate 12 consisting of a thin transparent conducting film. On this film is deposited the storage surface in the form of a thin layer 13 of a photo-conductive material. An optical image of the object is formed on the storage surface 13 by the lens 3, the light passing through the glass wall 11 and the transparent signal plate 12. The back of the storage surface is scanned by a low velocity beam of electrons. The signal plate 12 is connected via a resistance 14 to a source of potential which is positive with respect to the cathode, usually by about 20 volts. The mode of operation of such photo-conductive tubes is well-known and need not be further described.

Figure 4:
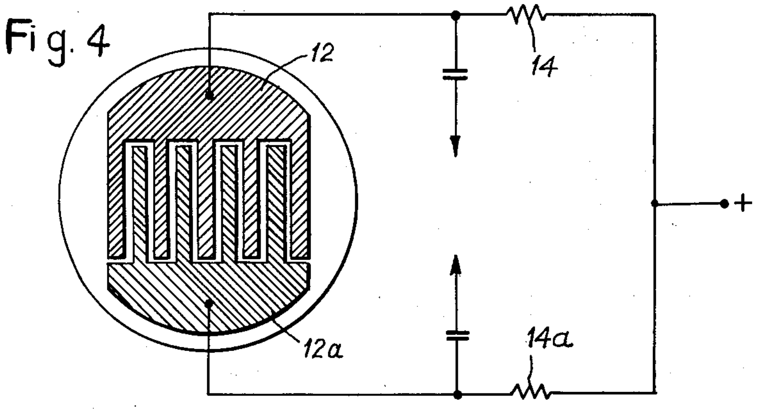

The camera tube 1 is specially constructed for deriving the signals corresponding to the red and green components. According to the embodiment shown in FIGURE 4 this is achieved by constructing the signal plate in the form of many parallel transparent conducting strips disposed at right angles to the line scanning direction of the electron beam. Each strip is insulated from its neighbouring strip and every alternate strip is connected together at one of its ends. The remaining strips are connected together at their opposite ends. In this way two separate interleaved signal plates 12 and 12*a* are formed. If a conventional storage layer of photo-conductive material is now deposited over the whole area of the signal plates in the normal manner, and separate resistances 14, 14*a* are inserted (one in series with each of the signal plates) and are joined together and taken to the normal source of positive potential for the signal plate, it will be seen that when a small diameter scanning-beam impinges on the photo-conductive layer over one of the signal plate strips, the signal currents will only flow through the resistance 14 or 14*a* which is connected to that strip. When the beam moves to a position over the adjacent signal plate strip the signal currents will only flow in the other resistance. In other words all picture elements optically formed through a given signal plate strip will produce signal currents only in the resistance connected to that strip. By causing the light from the picture elements corresponding to the different strips to be selectively modified, for example by passing through different light filters, the signal currents produced in the resistances 14, 14*a* associated with the two signal plates will be correspondingly modified.

This is achieved by one or more optical filters produced by depositing strips of optical filter material on or below the signal plate strips. For example, a filter material capable of passing the red components of the object in the picture (but not the green components) may be deposited below every alternate signal plate strip so that only "red" light reaches these signal plate strips and is passed through them to form a "red" image on the corresponding areas of the photo-conductive material 13. Similarly strips of optical filter material capable of passing only the green components (but not the red components) of the object picture may be deposited below every other alternate signal plate strip not already provided with a red filter so that only "green" light can pass through these strips and form a "green" image on the corresponding areas of the photo-conductive material. In each case the blue components are removed by the external minus blue filter 5. It will be seen that with such an arrangement only the red components from the object will produce signals in the resistance, for example 14, connected to the "red" signal plate strips and only the green components will produce signals in the other resistance, for example 14*a*, connected to the "green" signal plate strips.

There is thus produced a single camera tube capable of analysing both the red and the green components of the object and of delivering the electrical signals corresponding to these components from two separate outputs, one red and one green. If the width of each strip is made half the width of a television picture element, each individual element may be analysed in terms of red and green components. With such an arrangement there can be no registration errors between red and green signals and the relative gamma errors will be substantially reduced, if not entirely eliminated, as the two signals are taken from one tube instead of two tubes (which may have different gamma characteristics). It is pointed out that it is not necessary that the "spot" diameter of the electron beam on the photo-conductive surface should be equal to or less than the width of an individual signal plate strip. It may, in fact, cover several signal plate strips, and there may be several strips (for each colour) to the television picture element or "spot" diameter.

The fineness of the charge pattern on the photo-conductive layer will be much finer than that required by the normal television system. It is limited by the optical limitations of the system as well as the structure and sideways leakage of the photo-conductive layer and not by the beam "spot" size which only limits the resolution obtainable from the signal plate.

This fine charge pattern will still be divided into alternate "red" and "green" strips and the comparatively large "spot" will make electrons available to several strips simultaneously. These will be taken from the beam as determined by the fine charge pattern on the photo-conductive surface and each strip will still only carry currents associated with its own colour. In other words, this camera tube produces truly simultaneous red and green outputs, element by element. The "spot" size requirements for such a camera tube are no different from a conventional "black and white" camera tube, i.e. the spot diameter should be comparable with a television picture element.

The above describes the basic principle on which the new green/red camera tube works. It is also possible to obtain similar results by leaving out one set of filters. For example, if only red (or magenta) filters of a suitable characteristic are used, the "red" resistance will only provide red signals but the other resistance will provide both green and red signals (blue being eliminated by the minus blue filter 5 in front of the camera tube). If now the red signals are electrically subtracted from the green and red output (with if necessary attenuation of one or the other signal to achieve the right proportions) only the green signal will remain. Thus separate red and green outputs can be obtained with a simplified tube construction.

Figure 5:
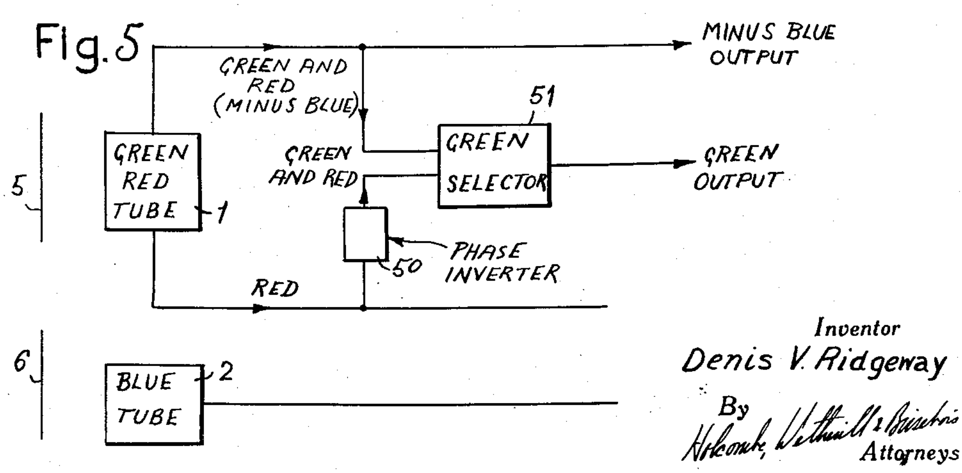

A block circuit diagram for such an arrangement is shown in FIGURE 5. The red output signal from the red/green tube 1 is fed through a phase inverter 50 to a mixer 51, constituting a green selector, to which the combined green and red output signal from the red/green tube 1 is also fed, without phase inversion. The two sets of signals are mixed in the mixer 51 whereby the signals corresponding to the red component will cancel each other and only the signals corresponding to the green component will be present in the output from the mixer 51.

As will be clear from FIGURE 5, the camera arrangement provides not only "red," "green" and "blue" component signal outputs, but also a "minus blue" signal output. By combining the "blue" and "minus blue" outputs in suitable proportions, a "black and white" signal is available if required.

The arrangement of FIGURE 5 leads to further possibilities. Thus by mixing the "green" output in anti-phase with the "minus blue" output, the red component of the combined red/green signal may be separated and mixed with the other red signal from the tube to increase the red signal output.

It is not necessarily desirable for the two sets of strips to be of equal width. If the signals from the two outputs are not equal for "white" light of the required colour temperature, possible owing to filter losses in one channel being greater than in the other, then the overall camera tube sensitivity may be improved and the two gamma characteristics made more nearly the same by increasing the strip widths of the colour that is limiting the performance and decreasing the strip widths of the colour with the larger output until the two outputs are substantially equal.

It is actually advantageous to use a separate conventional type of tube for the blue channel. Most of the convenient light sources for illumination are deficient in energy at the blue end of the spectrum. This, coupled with the losses in the blue filter, results in the blue channel limiting the sensitivity in certain types of 3-tube colour cameras. In order to try to reduce the effect of this limitation, light sources that are overrun are often used in order to increase the blue content. This is uneconomical as such light sources have a comparatively short life. Even under these conditions the sensitivity of the camera is usually still limited by the blue channel, which may be down on the green channel sensitivity by a factor of greater than 2. In the case of the new green/red camera tube, the green sensitivity (and the red) may be down a conventional tube by a factor of 2 (assuming that both tubes are the same size) owing to the total available photoconductive area having to be shared between the two separate outputs. By retaining a conventional tube for the blue channel, the overall sensitivity of the new camera will be no worse than the sensitivity of a conventional 3-tube camera working with a tungsten light source which is not being overrun, and from the point of view of matching the blue tube gamma characteristic to the green and red characteristics, the position is more favourable as the outputs are more nearly equal.

One method of making the special filters and double signal plate required in the camera tube according to this invention is to deposit the strip filters on the glass disc forming the end wall of the tube by means of a suitable masking process. By the use of the same mask the signal plate strips are deposited in two operations and alternate strips are joined together at opposite ends. The single or both filters is/are applied in a similar manner. This method requires working to a high degree of accuracy as accurate mechanical registration must be maintained between the filters and the signal plate strips, and also between adjacent signal plate strips in order to ensure that they do not touch each other. As the dimensions involved are extremely small this is a difficult process and the space between adjacent signal plate strips must inevitably be wasted.

A feature of this invention therefore consists in a novel method of making the light filter and signal plate assembly which overcomes most of the above difficulties and does not require the use of a mask. To this end, the transparent support for the filters and signal plates is made by engraving, etching or otherwise forming or assembling one or more transparent members to provide surface areas located in different planes and lying side-by-side when viewed normal to said surface areas, and the filter elements and/or the signal plate elements are deposited on the areas in the different planes. Due to the introduction of the third dimension, the method enables techniques which have no mechanical registration problems associated with them to be adopted. This novel method may be carried into practice in a number of different ways, some of which will now be described.

Figure 6:
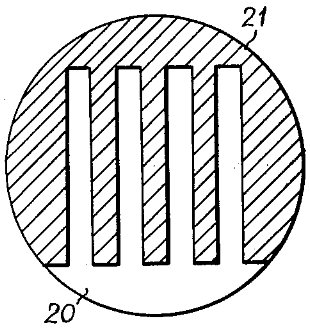
Figure 7:
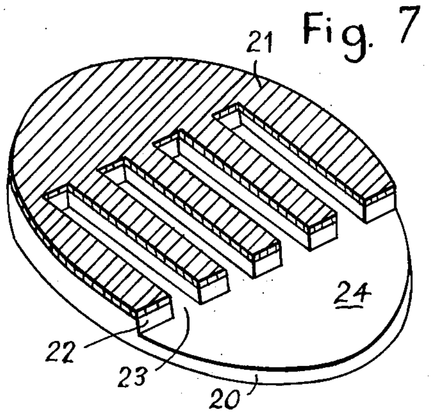
Figures 8, 13:
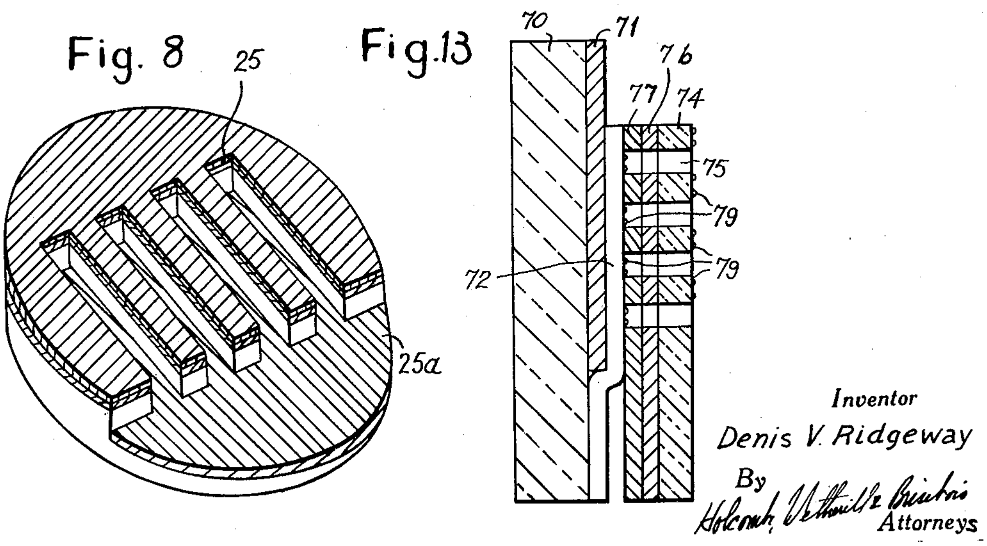
FIGURE 13 is a section through a modified target assembly for an orthicon type tube.

Firstly referring to FIGURES 6, 7 and 8, an assembly with only one set of filters will be considered. A glass disc 20, which may finally constitute the end wall 11 of the tube, is covered on one side with a thin uniform film or layer of a filter material with the required optical performance. This material must be capable of withstanding the high temperatures (300–400° C.) that will eventually be encountered when it is processed in the finished tube. It must also be sufficiently inert to avoid outgassing troubles when the tube is evacuated. One material that meets these requirements is a liquid lustre used for decorating glassware. This is normally fired-on in a kiln at a temperature of the order of 500° C. and after firing all that remains are metals and metal oxides in the form of a layer that is only a few millionths of an inch thick. A very suitable lustre is one based on a gold and silicon suspension that is magenta in colour. It passes "red" freely but it transmits very little "green" and at 540-millimicrons the transmission may be 400 times down on that at 620-millimicrons. The "blue" transmission may be disregarded as a minus blue filter is used in front of the camera tube.

The glass disc 20 on which is deposited the filter 21 is now covered with a suitable acid resist and machine engraved on the filter side to remove the resist to the configuration shown in FIGURE 6. It is then acid etched so as to produce strips 22 and grooves 23 as indicated in FIGURE 7. A plateau 24 will also be formed at one end of the strips where the resist was removed during engraving. After etching, the resist is removed leaving the disc in the form shown in FIGURE 7. Obviously these figures are only diagrammatic and not to scale. The width of each groove is about half the size of a television picture element, and as stated earlier, there can be several strips and grooves to a picture element. The depth of the groove should not be more than groove width, for reasons of mechanical strength, but it may be less than a groove width. The sides of the groove should be normal to the filter surface, or preferably slightly undercut.

There is thus produced two surfaces on different planes, one covered with a filter and one without. A transparent conducting coating 25, 25*a* is now evaporated in vacuum on to these surfaces from a distant point source so that metal is deposited normally, and not obliquely, on to these two surfaces. It may be desirable to employ a small aperture between the point source and the surfaces through which the metal to be deposited has to pass, thus stopping metal being deposited obliquely. As this will restrict the area covered by the metal it will then be necessary to move the disc during evaporation so that the whole of the disc will be covered. Metal deposited in this manner will form a film on the two surfaces and not on the sides or ends of the grooves 23 because the deposition of metal in this manner substantially obeys optical laws. The required two separate interleaved signal plates 25, 25*a* are thus formed in this one operation and with the minimum of waste space between them (see FIGURE 8). All that remains to be done is to make connections to the two end sections of the signal plates, to deposit the photo-conductive layer across the whole surface, and to seal the finished component into a camera tube with a standard electrode assembly.

Where two filters are required, the glass without a filter is engraved and etched as above and the resist is removed. A suitable filter material is then deposited over the whole surface and particularly in the grooves. If necessary, it is then fired-on in a kiln. The grooves are then filled-in temporarily with a suitable filling material, which can be removed later, and the filter on the top surface is ground off just down to the clear glass. The second filter is then deposited over this surface and allowed to dry. The filling material is removed together with those portions of the second filter that are on its surface and, if necessary, the component is fired again in a kiln. The rest of the process is identical to that described above.

According to another method of construction the transparent filter support may be assembled from two superimposed glass plates, one of which is very thin and is etched right through to form a series of strips separated by slots. The strips are connected together at one or both ends and the slotted plate is secured on the imperforate plate to form the support with the surface areas for the signal plates in different planes. One signal plate may be deposited on the surface of the imperforate glass plate before the perforated glass plate is assembled thereto. The light filter layer and the signal plate may be applied to the surface of the perforated glass plate either before or after it is assembled to the imperforate glass plate.

Figure 9:
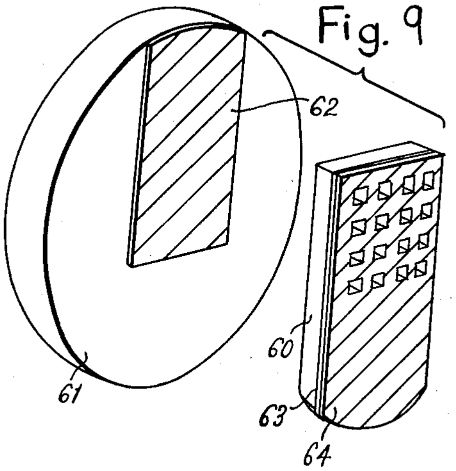

In order to strengthen the very fragile glass strips of the perforated glass plate, they may be joined together at intermediate points along their length by cross strips of glass to form a glass mesh. The perforations may be rectangular, circular, triangular or of any other desired shape. An embodiment of the target assembly of a photo-conductive pick-up tube constructed in this way will now be described with reference to FIGURES 9 and 10.

For the manufacture of the perforated glass plate, use is made of a photo-sensitive glass known under the trade name "Fotoform" which is manufactured by Corning Glass Works of Corning, New York, United States of America. As described in an article entitled "Chemical Machining Photosensitive Glass' by Marshall Byer in the June 1956 issue of "Materials and Methods," this photo-sensitive glass has the property of crystallizing when exposed to ultra-violet light and the crystallized portion is more rapidly attacked by the etching fluid than any unexposed non-crystalline portion. To produce the perforated plate required in the pick-up tube, a thin plate of photo-sensitive glass is exposed to ultra-violet light through a mesh and is then heat treated and etched to produce a perforated plate as shown at 60 in FIGURES 9 and 10. The perforated plate 60 is ground to a thickness of about .002″ and is assembled to an imperforate glass disc 61 on the target part of the surface of which has already been applied a signal plate 62. On the opposite surface of the plate 60 (preferably before assembly) is applied a red or magenta filter layer 63 and a second signal plate 64. The whole surface of the filter assembly is then covered with the layer 65 of photo-conductive material.

Figure 10:
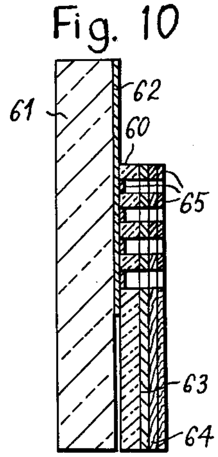
FIGURE 10 is a section through the target assembly of FIGURE 9.

As will be apparent from FIGURE 10, incident light having passed through the external minus blue filter will produce signals corresponding to both red and green components at the signal plate 62, and after passing through the red filter 63 will produce red component signals at the signal plate 64.

Similar methods of construction may be applied in the construction of an orthicon type tube as will now be described with reference to FIGURES 11 and 12.

In this embodiment the glass disc 70, which may be the glass end wall of the tube, is provided with a transparent conductive signal plate 71, partially covered by a transparent insulating layer 72, a part 73 of the signal plate being left uncovered for making electrical connection thereto. The insulating layer 72 may be a thin glass sheet. A thin plate 74 of photo-sensitive glass, for example two thousandths of an inch thick, is provided with a perforated area substantially equal to the area to be scanned by the electron beam. The perforations 75 are preferably rectangular, and are spaced and dimensioned to provide parallel rows of perforations similar to the strips in the previous embodiments, there being at least one recess and one glass strip per picture element. The perforated plate 74 is provided with a filter 76, which may be the magenta filter described previously. A second transparent conducting signal plate 77 is then deposited over the area of the plate 74 to be scanned by the electron beam with an additional extension beyond this area for connection purposes, and without deposition on the side walls of the perforations 75. A transparent insulating layer 78 is then applied over at least the area of the signal plate 77. The plate 74 and the glass disc 70 are then assembled together in any suitable manner, and a target mosaic of photo-emissive material 79 is applied over the entire area of the assembly to be scanned by the electron beam, i.e. on the surface of the insulating layer 78 surrounding the perforations 75 and on the areas of the insulating layer 72 exposed by the perforations 75. The photo-emissive material 79 may be applied through a mesh to form discreet areas of the mosaic.

The tube described operates on the orthicon principle, combined red and green component signals being derived from the signal plate 71 and the red component signal from the signal plate 77.

Figures 11, 12, 14:
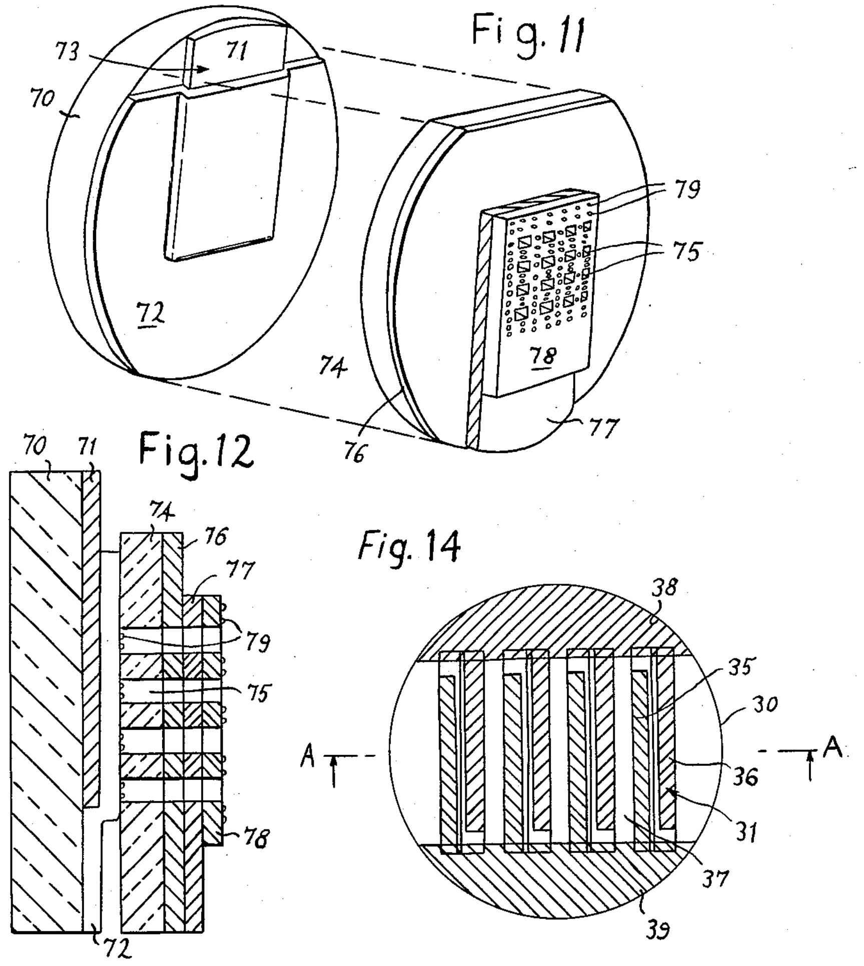
FIGURE 11 is an exploded perspective view of the elements of a target assembly for an orthicon type pick-up tube.
FIGURE 12 is a section through the assembly shown in FIGURE 11.
FIGURES 14 and 15 are diagrams explaining an alternative construction of signal plate strips and filters, FIGURE 15 being an enlarged section along the line A—A of FIGURE 14.

In order to avoid unnecessary capacity between the two signal plates 71 and 77, which would result in increased "cross-talk" between them, the areas of the signal plates are limited, as shown in FIGURE 11 so that the overlapping area is restricted to the absolute minimum. The capacity between the two signal plates may be further reduced by forming the signal plate 71, instead of as a continuous area, as interconnected parallel strips aligned behind the individual rows of perforations. These strips may be formed before the disc 70 and plate 74 are joined together by using the perforated plate 74 as a mask through which the conducting material is evaporated on to the disc 70. After a first evaporation the mask is displaced and the conducting material is again evaporated thereon to coat the areas on the disc 70 between the previously coated areas thereon so as to join them together as strips. The strips are then electrically joined together at one end for connection purposes. The conducting material which is evaporated on to the perforated plate, when being used as a mask, forms the signal plate 77.

Various modifications of the embodiment just described are possible. For example, the perforations 75 may be of a shape other than rectangular and may be arranged in other than vertical rows. Further, if the material used for the light filter layer is sufficiently insulating, it may be used in substitution for the insulating layer 78 by applying it between the signal plate 77 and the photo-emissive material 79. In another modification, the perforated plate 74 may itself constitute the insulating capacity layer between the photo-emissive material and the signal plate 77. In this modification, as shown in FIGURE 13, after the second signal plate 77 and the filter 76 have been applied to the perforated plate 74, the plate 74 is assembled to the disc 70 with the signal plate 77 facing towards the disc 70, and the photo-emissive material 79 is then applied.

Figure 15:
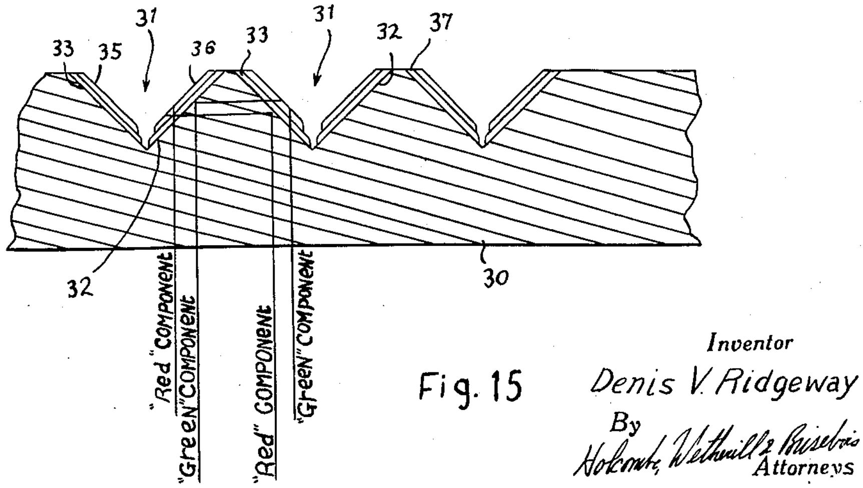

FIGURES 14 and 15 illustrate an alternative method of constructing the filter signal plate which results in a more efficient camera tube. In the construction described above, the filters only pass that part of the visible spectrum with which they are concerned and the rest of the light spectrum that falls on these filters is lost, either by absorption or reflection. In the alternative construction now to be described, the light that is not required to pass through a given filter is reflected on to the adjacent filter through which it can pass. This results in a camera tube that uses more of the available light and therefore, all other things being equal, requires less illumination of the object to be transmitted.

In this case, V-shaped grooves 31 (90 degrees) are engraved or otherwise formed in the glass disc 30 instead of rectangular grooves. After the plain glass 30 has been engraved with the 90° V-grooves 31, a multi-layer dichroic filter 32, capable of withstanding 400° C. and with the desired optical characteristics (say, transmit red and reflect green), is evaporated in vacuum on to one face of each V-groove. This may be readily achieved by evaporating from a distant point source so positioned that, owing to the angle of incidence (45° to the top surface of the disc), it can only "see" one face of each V-groove. The glass is then turned through 180° in the same plane and now the point source can only "see" the other face of each V-groove. The second set of dichroic filter strips 33 (say, transmit green and reflect red) is then evaporated on to these exposed surfaces. A similar procedure is adopted to deposit the two sets of signal strips 35, 36. In this case the angle of incidence is made slightly greater than 45° so that the crest of each groove will intercept the metal being evaporated and so prevent it being deposited at the extreme bottom of the V-groove in a similar manner to a shadow being cast. This ensures that the two adjacent signal strips do not touch each other at the bottom of the grooves. However, they will touch at the crest of each groove but this connection is removed by slightly polishing off the crests of the grooves, after evaporation, as shown at 37.

With this construction a special procedure is required in order easily to make the necessary alternate end connections to the large number of small individual signal strips. It is not until all of these end connections have been made that the two separate interleaved signal plates are formed. One method of achieving this is to make all "red" signal strips 36 project beyond the rectangular optical image area in one direction only and to make all "green" signal strips 35 project beyond the image area in the other direction only. As the two sets of strips are now clearly identified, it is comparatively easy to join together and make connection to all the "red" strips 36 and also to all the "green" strips 35, for example by painting or otherwise depositing silver or other conducting material as shown at 38, 39.

In order to form the two separate interleaved signal plates in this manner, the V-grooves are made appreciably longer than the height of the rectangular area in which is formed the optical image. This additional length above and below the image rectangle is used for the alternate strip projections. Before the first set of signal strips is deposited the surplus length of the V-grooves is covered, at one end only, by a mask that extends to the edge of the image area. The first set of strips is then deposited on one face of each V-groove and these strips will then not only extend over the image area but also beyond it at the unmasked end of the V-grooves so providing the required projections. When the second set of strips is deposited, the mask is transferred to the other end of the V-groove, so covering these projections and enabling a second set of projections to be formed at the other end of the V-grooves.

After the connections have been made, all that remains to be done is to deposit the photo-conductive layer across the whole surface in the conventional manner and to seal the finished component into a camera tube with a standard electrode assembly.

Whilst particular embodiments have been described, it will be understood that various modifications may be made without departing from the scope of the invention.

Thus, for example, the television camera according to this invention may incorporate other types of camera tubes, and if desired, external filter grids.

Furthermore, the novel filter elements according to this invention and their method of construction can be used in other electron-optical or optical apparatus, for example in television picture reproducing apparatus or in purely optical apparatus.

It will be understood that the novel pick-up tube according to this invention is not limited to use in colour television, but can also be employed in stereoscopic television in association with an appropriate lens system. In this case the filter or filters associated with the signal plate elements may either be appropriately coloured or polarised.

I claim:

1. A colour television camera incorporating only two camera tubes to analyse a subject in terms of its green, red and blue components, and comprising a first camera tube including means for producing two different signals corresponding to the green and red components of a subject, a second camera tube including means for producing a single signal corresponding to the blue component only of said subject, means for splitting the light from the subject into two beams, and means for focussing said beams respectively on to the two tubes.

2. A camera as claimed in claim 1, including a minus blue filter mounted in the path of the light beam focussed on to said first tube, and a blue filter mounted in the path of the light beam focussed on said second tube.

3. A camera as claimed in claim 2, wherein said first tube includes a target consisting of a transparent support, elements of a first transparent conducting signal plate covering areas of said support, elements of a second transparent conducting signal plate covering the remaining areas of said target and electrically insulated from said first signal plate, one of a red and green light filter carried by said support in optical register with said first signal plate, and photo-sensitive material covering the target area of said first tube for illumination by light from the subject passing through said signal plates.

4. A camera as claimed in claim 3, including the other of said green and red light filters carried by said support, in optical register with said remaining areas.

5. A camera as claimed in claim 3, wherein a minus blue signal is produced at said second signal plate, and means for subtractively combining the signals from said two signal plates to produce the other of the red and green signals which is not produced at the first signal plate.

6. A television pick-up tube including a target consisting of a transparent support having contiguous areas distributed over the surface of the support in two different planes, elements of a first transparent conducting signal plate covering the areas in one plane, elements of a second transparent conducting signal plate, electrically insulated from its first signal plate, covering the areas in the other plane, a light modifying filter in optical register with the first signal plate, and photo-sensitive material covering the area of the target and disposed so as to be illuminated by light from a subject which passes through the signal plates.

7. A pick-up tube as claimed in claim 6, including another light modifying filter, carried by said supports in optical register with said second signal plate.

8. A pick-up tube as claimed in claim 6, including a photo-sensitive material comprising a photo-conductive layer applied over the target in contact with both signal plates.

9. A pick-up tube as claimed in claim 6, including a layer of insulating material applied over the signal plates and a photo-sensitive material comprising a mosaic of photo-emissive material applied over the insulating material.

10. A television pick-up tube including a target consisting of a transparent support comprising a transparent imperforate sheet, a transparent perforate thin sheet assembled thereto over the target area of the support, said assembly providing contiguous areas in two different planes, said perforate sheet having a large number of perforations distributed over the target area, a first signal plate and a light filter applied over the surface of said perforate sheet, a second signal plate electrically insulated from said first signal plate applied to the surface of said imperforate sheet to cover at least those areas thereof which are in optical register with said perforations when the imperforate and perforate sheets are assembled together, and a photo-sensitive material covering the target area, for illumination by light from a subject passing through said first and second signal plates.

11. A pick-up tube as claimed in claim 10, wherein said first signal plate is applied to that surface of said perforate sheet which is exposed when the two sheets are assembled together, and wherein said photo-sensitive material comprises a layer of photo-conductive material applied over the target in contact with said first and second signal plates.

12. A pick-up tube as claimed in claim 10, including a first layer of insulating material covering said first signal plate and second layer of insulating material covering the said second signal plate, said photo-sensitive material comprising a photo-emissive material applied as a mosaic over said first and second insulating layers.

13. A pick-up tube as claimed in claim 12, wherein said first signal plate is applied on that side of the perforated sheet which lies adjacent to the imperforate sheet when the sheets are assembled together, whereby the perforate sheet itself constitutes the first insulating layer, the first signal plate being insulated from the second signal plate by said second layer of insulating material.

References Cited in the file of this patent

UNITED STATES PATENTS

| | | |
|---|---|---|
| 2,333,969 | Alexanderson | Nov. 9, 1943 |
| 2,602,854 | Bedford | July 8, 1952 |
| 2,641,642 | Behrend | June 9, 1953 |
| 2,734,938 | Goodale | Feb. 14, 1956 |
| 2,763,714 | Weimer | Sept. 18, 1956 |
| 2,843,659 | James | July 15, 1958 |
| 2,901,531 | McCoy | Aug. 25, 1959 |